(12) United States Patent
Ling

(10) Patent No.: US 9,325,659 B2
(45) Date of Patent: Apr. 26, 2016

(54) METHOD AND APPARATUS FOR ADDING FRIEND, AND STORAGE MEDIUM

(71) Applicant: TENCENT TECHNOLOGY (SHENZHEN) COMPANY LIMITED, Shenzhen (CN)

(72) Inventor: Guo Ling, Shenzhen (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 77 days.

(21) Appl. No.: 14/377,459

(22) PCT Filed: Jan. 18, 2013

(86) PCT No.: PCT/CN2013/070671
§ 371 (c)(1),
(2) Date: Aug. 7, 2014

(87) PCT Pub. No.: WO2013/117125
PCT Pub. Date: Aug. 15, 2013

(65) Prior Publication Data
US 2015/0304266 A1 Oct. 22, 2015

(30) Foreign Application Priority Data

Feb. 8, 2012 (CN) .......................... 2012 1 0027087

(51) Int. Cl.
*G06F 15/16* (2006.01)
*H04L 12/58* (2006.01)
(Continued)

(52) U.S. Cl.
CPC ........ *H04L 51/32* (2013.01); *G06K 7/10* (2013.01); *G06K 7/1417* (2013.01); *H04L 12/58* (2013.01); *H04L 63/0407* (2013.01); *H04L 65/403* (2013.01); *H04W 4/206* (2013.01)

(58) Field of Classification Search
CPC ....... H04L 12/58; H04L 63/0407; G06K 7/10
USPC ......................................................... 709/206
See application file for complete search history.

(56) References Cited

U.S. PATENT DOCUMENTS

2010/0219240 A1* 9/2010 Yang ................. G06F 17/30879
235/375
2011/0283172 A1  11/2011 Berger et al.
2015/0248571 A1* 9/2015 Tao ....................... G06F 3/0482
235/462.1

FOREIGN PATENT DOCUMENTS

CA          2784766 A1    7/2011
CN          1937533 A     3/2007
(Continued)

OTHER PUBLICATIONS

Chinese Office Action issued Jun. 3, 2014 re: CN Application No. 2012100270872; pp. 1-9.

(Continued)

*Primary Examiner* — Arvin Eskandarnia
(74) *Attorney, Agent, or Firm* — Cantor Colburn LLP

(57) ABSTRACT

A method and apparatus for adding friend are described. The method includes: scanning to acquire a two-dimension code shared by a two-dimension code sharing user; parsing the two-dimension code to obtain a responsive user identifier; judging a relationship between the user identifier and a user identifier of the two-dimension code sharing user; and if the relationship is a stranger relationship, entering a friend adding interface and adding the two-dimension code sharing user as a friend. The present method is capable of avoiding leakage of user information.

9 Claims, 3 Drawing Sheets

(51) Int. Cl.
*G06K 7/10* (2006.01)
*H04L 29/06* (2006.01)
*G06K 7/14* (2006.01)
*H04W 4/20* (2009.01)

(56) References Cited

FOREIGN PATENT DOCUMENTS

| | | |
|---|---|---|
| CN | 101150629 A | 3/2008 |
| CN | 101187974 A | 5/2008 |
| CN | 101778052 A | 7/2010 |
| CN | 102332285 A | 1/2012 |
| CN | 103220205 A | 7/2013 |
| KR | 1020000064202 A | 11/2000 |
| KR | 1020110034497 A | 4/2011 |

OTHER PUBLICATIONS

European Search Report issued Jun. 16, 2015 re: EP Application No. 13 74 6468; pp. 1-6.
International Report on Patentability and Written Opinion issued Aug. 12, 2015 re: Application No. PCT/CN2013/070671; pp. 1-12.
Korean Office Action issued Jun. 27, 2014 re: KR Application No. 10-2014-7017808; pp. 1-9.
International Search Report issued Apr. 18, 2013 re: PCT/CN2013/070671; citing: CN 101150629 A, CN 1937533 A and CN 101187974 A.
Written Opinion issued Apr. 18, 2013 re: PCT/CN2013/070671; citing: CN 101150629 A and CN 1937533 A.

* cited by examiner

METHOD AND APPARATUS FOR ADDING FRIEND, AND STORAGE MEDIUM

FIELD OF THE TECHNICAL

The present disclosure relates to communication technologies, and more particularly to a method and apparatus for adding friend, and storage medium.

BACKGROUND ART

In instant messaging applications, a current method for adding friends is to search for a corresponding friend by inputting a nickname or user account to be added as a friend and add the searched friend. This method for adding friends may leak user information, causing the user being harassed due to the leakage of the user information.

SUMMARY

One embodiment of the present disclosure provides a method and apparatus for adding friends and storage medium, which can avoid leakage of user information, thereby avoiding the user from being harassed due to the leakage of the user information.

In order to achieve the above purpose, one embodiment of the present disclosure adopts following technical solution:

A method for adding friends includes:
  scanning to acquire a two-dimension code shared by a two-dimension code sharing user;
  parsing the two-dimension code to obtain a user identifier of the two-dimension code sharing user;
  judging a relationship between a user identifier of a two-dimension code scanning user and the user identifier of the two-dimension code sharing user;
  if the relationship between the user identifier of the two-dimension code scanning user and the user identifier of the two-dimension code sharing user is not a friend relationship, entering a friend adding interface and adding the two-dimension code sharing user as a friend;
  wherein the user identifier is a unique identifier of the two-dimension code sharing user;
  wherein the two-dimension code is a personalized two-dimension code generated through a two-dimension code control software.

A method for adding friends includes:
  scanning to acquire a two-dimension code shared by a two-dimension code sharing user;
  parsing the two-dimension code to obtain a user identifier of the two-dimension code sharing user;
  judging a relationship between a user identifier of a two-dimension code scanning user and the user identifier of the two-dimension code sharing user;
  if the relationship between the user identifier of the two-dimension code scanning user and the user identifier of the two-dimension code sharing user is not a friend relationship, entering a friend adding interface and adding the two-dimension code sharing user as a friend.

An apparatus for adding friends includes:
  a two-dimension code scanning unit configured to scan to acquire a two-dimension code shared by a two-dimension code sharing user;
  a parsing unit configured to parse the two-dimension code to obtain a user identifier of the two-dimension code sharing user;
  a judgment unit configured to judge a relationship between a user identifier of a two-dimension code scanning user and the user identifier of the two-dimension code sharing user;
  a friend adding unit configured to, if the relationship between the user identifier of the two-dimension code scanning user and the user identifier of the two-dimension code sharing user is not a friend relationship, enter a friend adding interface and add the two-dimension code sharing user as a friend.

A computer storage medium storing a computer program for implementing the above method.

Comparing with searching for a corresponding friend by inputting a nickname or user account to be added as a friend and adding the searched friend in the existed technology, in the method and apparatus for adding friends provided in one embodiment of the present disclosure, adding friend can be realized by scanning to acquire a two-dimension code shared by the two-dimension code sharing user and according to the relationship between the two-dimension code scanning user and the two-dimension code sharing user. Based on hiding properties of the two-dimension code information, ordinary people cannot directly obtain the hidden information in the two-dimension code information, thereby avoiding leakage of user information and further avoiding the user from being harassed due to the leakage of the user information.

BRIEF DESCRIPTION OF THE DRAWINGS

To illustrate the technical solutions of examples of the present disclosure more clearly, accompanying drawings for describing the examples are introduced briefly in the following. Apparently, the accompanying drawings in the following description are only some examples of the present disclosure, and persons skilled in the art may derive other drawings from the accompanying drawings without creative efforts.

DETAILED DESCRIPTION

The technical solutions of embodiments of the present disclosure are described in details hereinafter with reference to the accompanying drawings. Apparently, the described embodiments are only some embodiments of the present disclosure and not all the embodiments of the present disclosure. Based on the embodiments of the present disclosure, other embodiments obtained by persons skilled in the art without creative efforts should fall within the scope of the present disclosure.

Embodiment One

Figure 1:
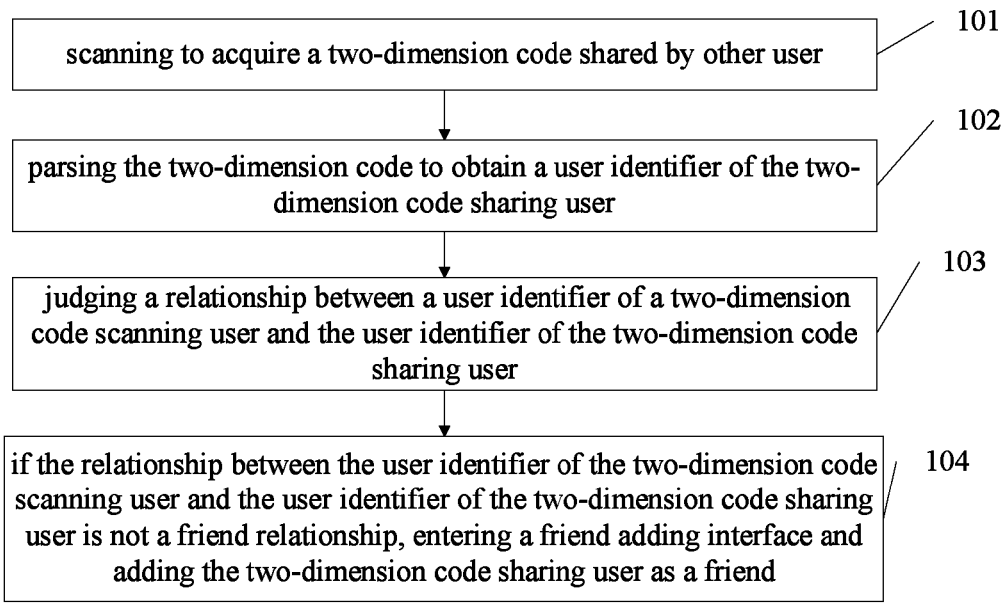
FIG. 1 is a flow chart of a method for adding friends according to one embodiment of the present disclosure.

This embodiment of the present disclosure provides a method for adding friends. As shown in FIG. 1, the method includes following steps.

Step 101: scanning to acquire a two-dimension code shared by other user (i.e., two-dimension code sharing user).

It should be noted, the two-dimension code (also referred as two-dimensional bar code) is a black and white graph distributed in specific geometries according to certain rules on the plane, i.e., a two-dimension direction, to record data symbol information; in the preparation of the code, it makes use of the concept of bit stream "0", "1" constituting the internal logic basis of computer, represents text numerical information with several geometries corresponding to binary system to achieve automatic processing of information through automatic recognition by image input device or photoelectric scanning device.

The two-dimension code shared by other user (i.e., two-dimension code sharing user) can be a two-dimension code shared in any form and this is not specifically limited in this embodiment of the present disclosure; for example, a two-dimension code picture displayed on a screen of a mobile phone or stored in the mobile phone, a two-dimension code picture shared on a website, a two-dimension code printed on a business card, etc.

Further, the two-dimension code can be a personalized two-dimension code generated by users according to their needs through a two-dimension code control software. This is not specifically limited in this embodiment of the present disclosure. For example, the two-dimension code can also be a traditional two-dimension code in a unified pattern which has no significant difference in typography and color. When the two-dimension code is a personalized two-dimension code, the personalized two-dimension code can be generated through following method which includes: a user entering a two-dimension code generation process, giving a default style by a two-dimension code control software, modifying by the user through the control software the style of the two-dimension code, so as to satisfy the user's preferences and generate the personalized two-dimension code.

Step 102: receiving the acquired two-dimension code, parsing the two-dimension code to obtain a user identifier of the two-dimension code sharing user.

The user identifier is a unique identifier corresponding to the two-dimension code sharing user, and can be used to distinguish the two-dimension code sharing user from other users.

Step 103: judging a relationship between a user identifier of a two-dimension code scanning user and the user identifier of the two-dimension code sharing user. Specifically, the relationship between the two-dimension code scanning user and the two-dimension code sharing user in an instant messaging software (for example, Tencent's QQ, etc.) or other kinds of software/applications (for example, WeChat, etc.) can be judged according to the user identifier of the two-dimension code scanning user and the user identifier of the two-dimension code sharing user.

The relationship between the above two usually includes a friend relationship, not friend relationship and finding no relationship. Of course, this is not specifically limited in this embodiment of the present disclosure.

Step 104: if the relationship between the user identifier of the two-dimension code scanning user and the user identifier of the two-dimension code sharing user is not a friend relationship, entering a friend adding interface and adding the two-dimension code sharing user as a friend.

The relationship between the user identifier of the two-dimension code scanning user and the user identifier of the two-dimension code sharing user is not a friend relationship, it indicates that the two-dimension code scanning user does not add the two-dimension code sharing user as a friend before.

Comparing with searching for a corresponding friend by inputting a nickname or user account to be added as a friend and adding the searched friend in the existed technology, in the method for adding friends provided in one embodiment of the present disclosure, adding friend can be realized by scanning to acquire a two-dimension code shared by other user (i.e., two-dimension code sharing user) and according to the relationship between the two-dimension code scanning user and the two-dimension code sharing user. Based on hiding properties of the two-dimension code information, ordinary people cannot directly obtain the hidden information in the two-dimension code information.

Embodiment Two

Figure 2:
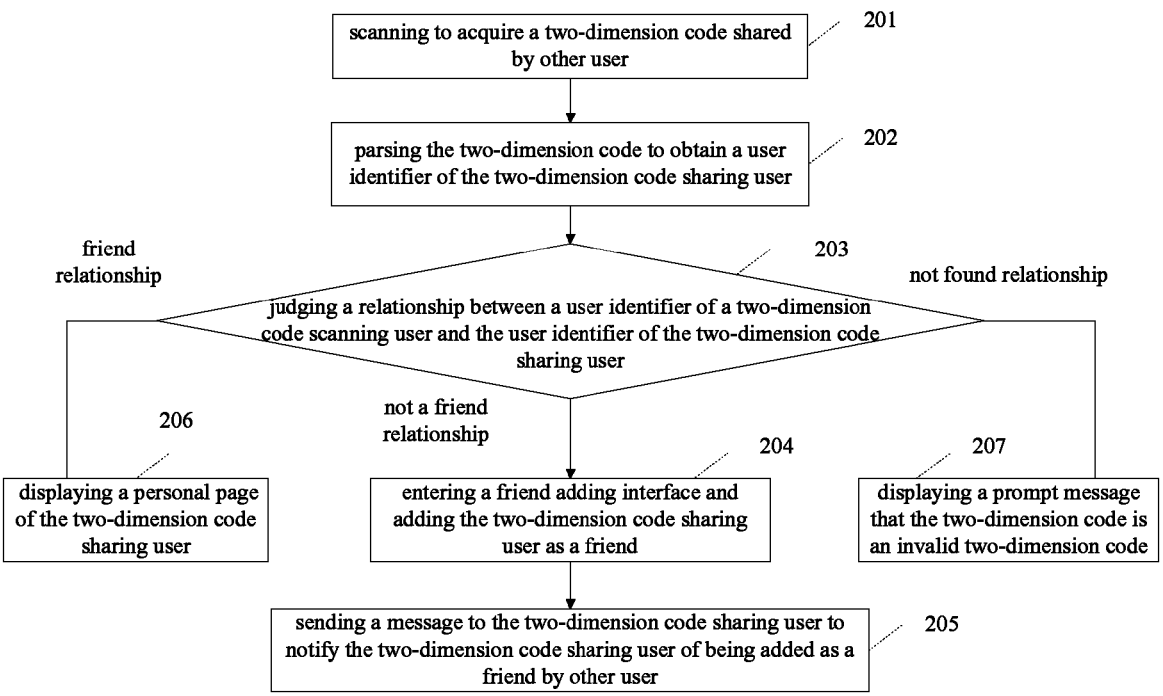
FIG. 2 is a flow chart of a method for adding friends according to another embodiment of the present disclosure.

This embodiment of the present disclosure provides a method for adding friends. As shown in FIG. 2, the method includes following steps.

Step 201: scanning to acquire a two-dimension code shared by other user (i.e., two-dimension code sharing user).

With respect to the description related to the two-dimension code, it can refer to the related description in the step 101 of the embodiment one, and this is not repeated here.

Step 202: receiving the acquired two-dimension code, parsing the two-dimension code to obtain a user identifier of the two-dimension code sharing user.

The user identifier is a unique identifier corresponding to the two-dimension code sharing user, and can be used to distinguish the two-dimension code sharing user from other users.

Step 203: judging a relationship between a user identifier of a two-dimension code scanning user and the user identifier of the two-dimension code sharing user; if the relationship between the user identifier of the two-dimension code scanning user and the user identifier of the two-dimension code sharing user is not a friend relationship, then performing step 204; if the relationship between the user identifier of the two-dimension code scanning user and the user identifier of the two-dimension code sharing user is a friend relationship, then performing step 206; if the relationship between the user identifier of the two-dimension code scanning user and the user identifier of the two-dimension code sharing user is not found, then performing step 207.

Step 204: entering a friend adding interface and adding the two-dimension code sharing user as a friend.

Step 205: sending a message to the two-dimension code sharing user to notify the two-dimension code sharing user of being added as a friend by other user, so that the two-dimension code sharing user can make a corresponding operation for this friend adding.

Sending a message to the two-dimension code sharing user can be realized by saying hello to the two-dimension code sharing user or sending a variety of forms of authentication information, and this is specifically limited in this embodiment, and can be realized through any other notification form. After the two-dimension code sharing user receives the message, the two-dimension code sharing user can choose to replay this dialog and adding the two-dimension code scanning user as a friend, or to refuse to receive any form or limited form of messages sent from the two-dimension code scanning user so as to provide for the two-dimension code sharing user a harassment prevention strategy and mechanism.

Step 206: displaying a personal page of the two-dimension code sharing user;

Step 207: displaying a prompt message that the two-dimension code is an invalid two-dimension code.

The prompt message can be displayed in the form of a dialog box, and this is not specifically limited in this embodiment of the present disclosure, and can also be displayed in other forms. Further, when displaying that the two-dimension code is an invalid two-dimension code, other auxiliary information such as "invalid two-dimension code, please try a correct invalid two-dimension code" or "return to try again", etc., can also be added at the same time.

Further, in order to facilitate an operator to confirm a success of two-dimension code scanning, after the scanning to acquire a two-dimension code shared by other user, this embodiment of the present disclosure provides following method including: outputting a prompt message that the scanning to acquire a two-dimension code shared by other user is successful. The prompt message can be vibration, effective or text, and this is not specifically limited in this embodiment of the present disclosure.

Comparing with searching for a corresponding friend by inputting a nickname or user account to be added as a friend and adding the searched friend in the existed technology, in the method and apparatus for adding friends provided in one embodiment of the present disclosure, adding friend can be realized by scanning to acquire a two-dimension code shared by other user and according to the relationship between the two-dimension code scanning user and the two-dimension code sharing user. Based on hiding properties of the two-dimension code information, ordinary people cannot directly obtain the hidden information in the two-dimension code information, thereby avoiding leakage of user information and further avoiding the user from being harassed due to the leakage of the user information. Moreover, manners of the user for adding friends can be extended.

Further, in one embodiment of the present disclosure, after adding the corresponding user as a friend through the two-dimension code, the message is sent to the two-dimension code sharing user to notify the two-dimension code sharing user of being added as a friend by other user, so that the two-dimension code sharing user can make a corresponding operation for this friend adding, thereby providing for the two-dimension code sharing user a harassment prevention strategy and mechanism.

Embodiment Three

Figure 3:
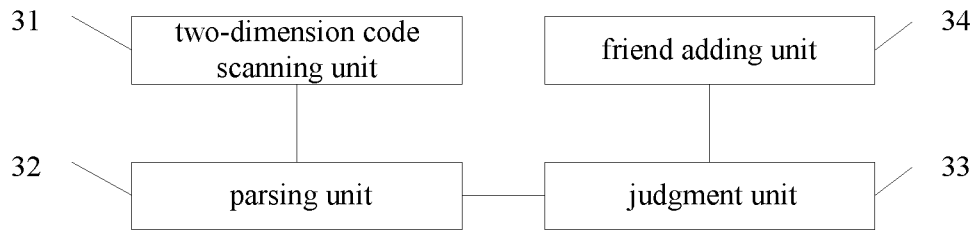
FIG. 3 is a diagram of an apparatus for adding friends according to one embodiment of the present disclosure.

This embodiment of the present disclosure provides an apparatus for adding friends. As shown in FIG. 3, the apparatus can include: a two-dimension code scanning unit 31, a parsing unit 32, a judgment unit 33 and a friend adding unit 34.

The two-dimension code scanning unit 31 is configured to scan to acquire a two-dimension code shared by other user (i.e., two-dimension code sharing user). The two-dimension code shared by other user (i.e., two-dimension code sharing user) can be a two-dimension code shared in any form and this is not specifically limited in this embodiment of the present disclosure; for example, a two-dimension code picture displayed on a screen of a mobile phone or stored in the mobile phone, a two-dimension code picture shared on a website, a two-dimension code printed on a business card, etc. Further, the two-dimension code can be a personalized two-dimension code generated by users according to their needs through a two-dimension code control software. This is not specifically limited in this embodiment of the present disclosure. For example, the two-dimension code can also be a traditional two-dimension code in a unified pattern which has no significant difference in typography and color. When the two-dimension code is a personalized two-dimension code, the personalized two-dimension code can be generated through following method which includes: a user entering a two-dimension code generation process, giving a default style by a two-dimension code control software, modifying by the user through the control software the style of the two-dimension code, so as to satisfy the user's preferences and generate the personalized two-dimension code.

The parsing unit 32 is configured to receive the acquired two-dimension code from the two-dimension code scanning unit 31, parse the two-dimension code to obtain a user identifier of the two-dimension code sharing user. The user identifier is a unique identifier corresponding to the two-dimension code sharing user, and can be used to distinguish the two-dimension code sharing user from other users.

The judgment unit 33 is configured to judge a relationship between a user identifier of a two-dimension code scanning user and the user identifier of the two-dimension code sharing user. The relationship between the above two usually includes a friend relationship, not friend relationship and finding no relationship. Of course, this is not specifically limited in this embodiment of the present disclosure.

The friend adding unit 34 is configured to, if the relationship between the user identifier of the two-dimension code scanning user and the user identifier of the two-dimension code sharing user is a stranger relationship (not a friend relationship), enter a friend adding interface and add the two-dimension code sharing user as a friend.

Figure 4:
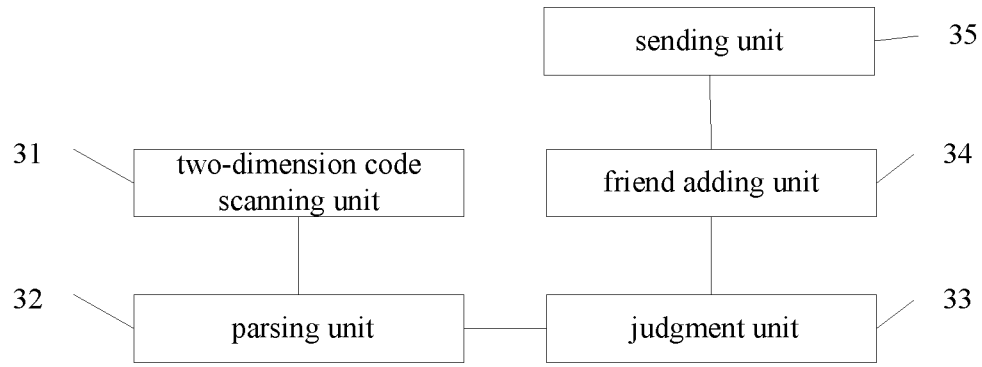
FIG. 4 is a diagram of an apparatus for adding friends according to another embodiment of the present disclosure.

Further, optionally, as shown in FIG. 4, the apparatus also includes a sending unit 35.

The sending unit 35 is configured to, after the friend adding unit 34 enters the friend adding interface and adds the two-dimension code sharing user as a friend, send a message to the two-dimension code sharing user to notify the two-dimension code sharing user of being added as a friend by other user, so that the two-dimension code sharing user can make a corresponding operation for this friend adding.

Figure 5:
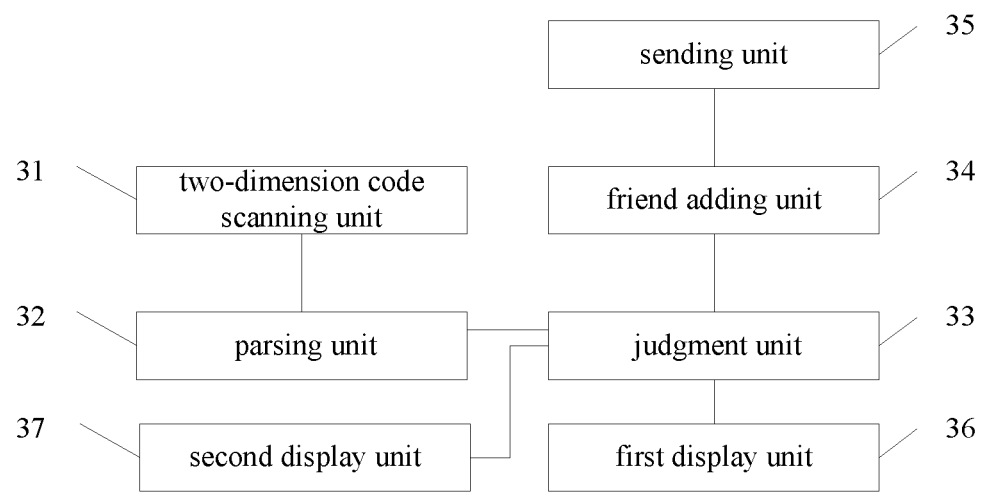
FIG. 5 is a diagram of an apparatus for adding friends according to yet another embodiment of the present disclosure.

Further, optionally, as shown in FIG. 5, the apparatus also includes a first display unit 36 and a second display unit 37.

The first display unit 36 is configured to display a personal page of the two-dimension code sharing user, if the relationship between the user identifier of the two-dimension code scanning user and the user identifier of the two-dimension code sharing user is a friend relationship.

The second display unit 37 is configured to display a prompt message that the two-dimension code is an invalid two-dimension code, if the relationship between the user identifier of the two-dimension code scanning user and the user identifier of the two-dimension code sharing user is not found.

Figure 6:
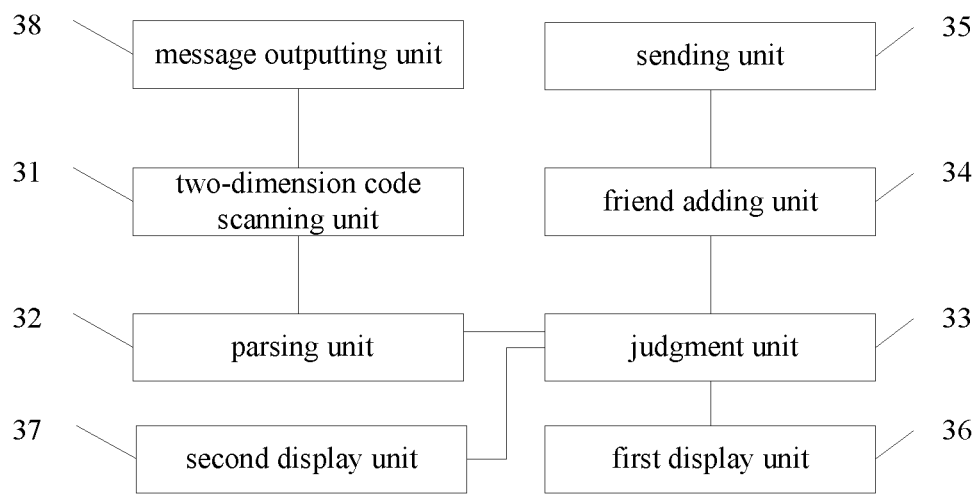
FIG. 6 is a diagram of an apparatus for adding friends according to still yet another embodiment of the present disclosure.

Further, optionally, in order to facilitate an operator to confirm a success of two-dimension code scanning, as shown in FIG. 6, the apparatus also includes a message outputting unit 38.

The message outputting unit 38 is configured to, after the two-dimension code scanning unit scans to acquire the two-dimension code shared by other user (i.e., the two-dimension code sharing user), output a prompt message that the scanning to acquire a two-dimension code shared by other user (i.e., the two-dimension code sharing user) is successful.

Comparing with searching for a corresponding friend by inputting a nickname or user account to be added as a friend and adding the searched friend in the existed technology, in the apparatus for adding friends provided in one embodiment of the present disclosure, adding friend can be realized by scanning to acquire a two-dimension code shared by other user (i.e., the two-dimension code sharing user) and according to the relationship between the two-dimension code scanning user and the two-dimension code sharing user. Based on hiding properties of the two-dimension code information, ordinary people cannot directly obtain the hidden information in the two-dimension code information, thereby avoiding leakage of user information and further avoiding the user from being harassed due to the leakage of the user information.

Further, in one embodiment of the present disclosure, after adding the corresponding user as a friend through the two-dimension code, the message is sent to the two-dimension code sharing user to notify the two-dimension code sharing user of being added as a friend by other user, so that the two-dimension code sharing user can make a corresponding operation for this friend adding, thereby providing for the two-dimension code sharing user a harassment prevention strategy and mechanism.

A computer storage medium of one embodiment of the present disclosure stores computer programs for implementing the method for adding friends in the above embodiments of the present disclosure.

According to the above description, it can be clearly understood by one skilled in the art that the technical solution of the present invention can be realized by software accompanying with necessary general hardware platforms, or by hardware. In many cases, the former is a preferred manner. Based on this, the essential part of the technical solution of the present invention or the part contributed to the prior art can be in the form of a software product. The computer software product can be stored in a readable storage medium such as a computer's floppy disk, hard disk or CD-ROM, etc., and can include a plurality of instructions to make a computer apparatus (such as a personal computer, a server, a network equipment, etc.) to execute the method described in each of the embodiments of the present disclosure.

The foregoing are only preferred embodiments of the present disclosure, and are not used to limit the present disclosure. Any modification, equivalent replacement, or improvement made without departing from the spirit and principle of the present disclosure should fall within the scope of the present disclosure. So the protection scope of the present disclosure should be defined by the protection scope of the claims.

The invention claimed is:

1. A method for adding friends comprising:
    scanning to acquire a two-dimension code shared by a two-dimension code sharing user;
    parsing the two-dimension code to obtain a user identifier of the two-dimension code sharing user;
    judging a relationship between a user identifier of a two-dimension code scanning user and the user identifier of the two-dimension code sharing user;
    if the relationship between the user identifier of the two-dimension code scanning user and the user identifier of the two-dimension code sharing user is not a friend relationship, entering a friend adding interface and adding the two-dimension code sharing user as a friend;
    wherein after the entering a friend adding interface and adding the two-dimension code sharing user as a friend, the method further comprises:
    sending a message to the two-dimension code sharing user to notify the two-dimension code sharing user of being added as a friend by other user, so that the two-dimension code sharing user makes a corresponding operation for this friend adding;
    wherein the method further comprises:
    displaying a personal page of the two-dimension code sharing user, if the relationship between the user identifier of the two-dimension code scanning user and the user identifier of the two-dimension code sharing user is a friend relationship.

2. The method of claim 1, further comprising:
    displaying a prompt message that the two-dimension code is an invalid two-dimension code, if the relationship between the user identifier of the two-dimension code scanning user and the user identifier of the two-dimension code sharing user is not found.

3. The method of claim 1, wherein
    after the scanning to acquire a two-dimension code shared by a two-dimension code sharing user, the method further comprises:
    outputting a prompt message that the scanning to acquire a two-dimension code shared by the two-dimension code sharing user is successful.

4. The method of claims from 1, wherein the two-dimension code is a personalized two-dimension code generated by a user according to the user's needs though the two-dimension code control software.

5. The method of claims from 1, wherein the user identifier is a unique identifier of the two-dimension code sharing user;
    wherein the two-dimension code is a personalized two-dimension code generated through a two-dimension code control software.

6. An apparatus for adding friends comprising:
    a two-dimension code scanning unit configured to scan to acquire a two-dimension code shared by a two-dimension code sharing user;
    a parsing unit configured to parse the two-dimension code to obtain a user identifier of the two-dimension code sharing user;
    a judgment unit configured to judge a relationship between a user identifier of a two-dimension code scanning user and the user identifier of the two-dimension code sharing user;
    a friend adding unit configured to, if the relationship between the user identifier of the two-dimension code scanning user and the user identifier of the two-dimension code sharing user is not a friend relationship, enter a friend adding interface and add the two-dimension code sharing user as a friend;
    wherein the apparatus further comprises:
    a sending unit configured to, after the friend adding unit enters the friend adding interface and adds the two-dimension code sharing user as a friend, send a message to the two-dimension code sharing user to notify the two-dimension code sharing user of being added as a friend by other user, so that the two-dimension code sharing user can make a corresponding operation for this friend adding;
    wherein the apparatus further comprises:
    a first display unit configured to display a personal page of the two-dimension code sharing user, if the relationship between the user identifier of the two-dimension code scanning user and the user identifier of the two-dimension code sharing user is a friend relationship;
    a second display unit configured to display a prompt message that the two-dimension code is an invalid two-dimension code, if the relationship between the user identifier of the two-dimension code scanning user and the user identifier of the two-dimension code sharing user is not found.

7. The apparatus of claim 6, further comprising:
a message outputting unit configured to, after the two-dimension code scanning unit scans to acquire the two-dimension code shared by the two-dimension code sharing user, output a prompt message that the scanning to acquire a two-dimension code shared by the two-dimension code sharing user is successful.

8. The apparatus of claims 6, wherein the two-dimension code is a personalized two-dimension code generated by a user according to the user's needs though a two-dimension code control software.

9. A computer storage medium storing a computer program for implementing the method of claim 1.

* * * * *